March 8, 1960     R. E. SNYDER ET AL     2,927,804
SWIVEL COUPLING WITH ADJUSTABLE PACKER MEANS
Filed July 5, 1956
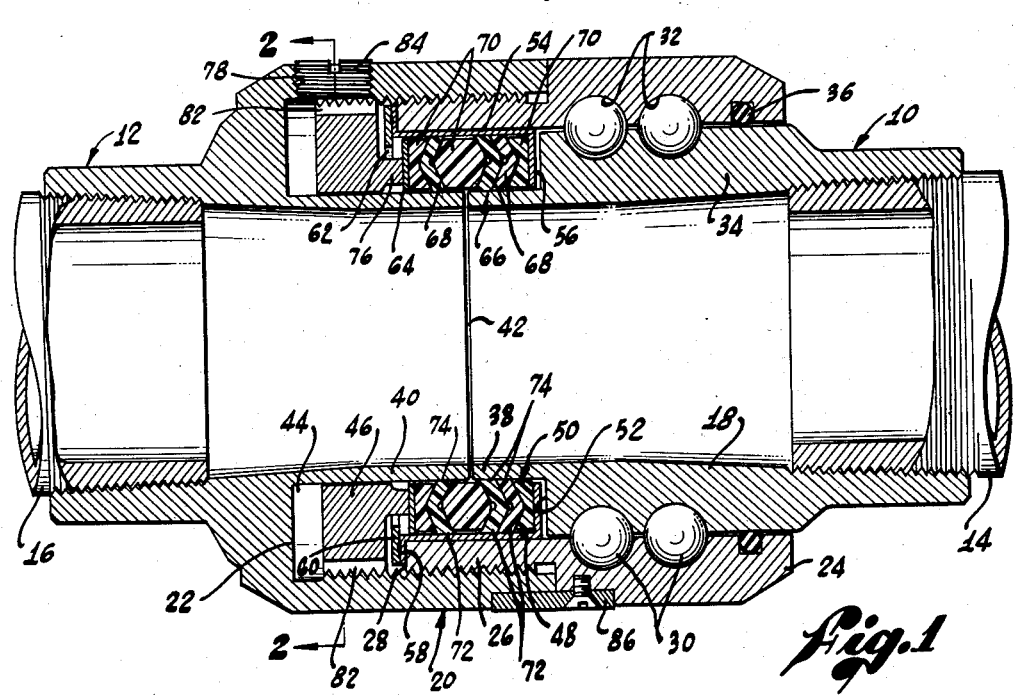
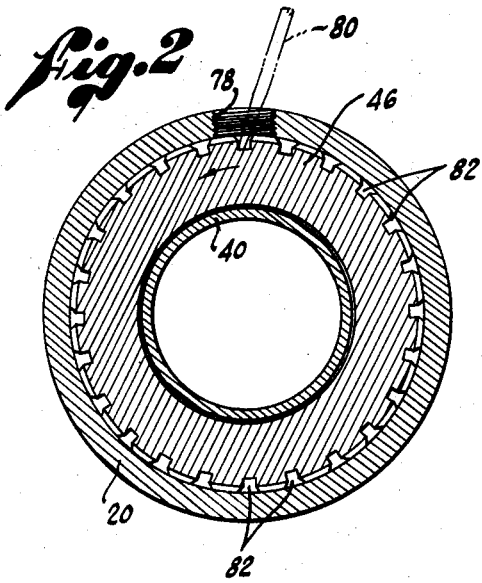
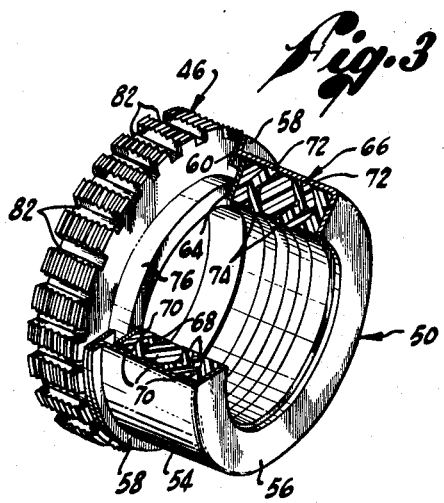
INVENTORS
ROBERT E. SNYDER
CLYDE B. TAYLOR
BY
*Gulwides Mattingly & Huntley*
ATTORNEYS

United States Patent Office 2,927,804
Patented Mar. 8, 1960

2,927,804

SWIVEL COUPLING WITH ADJUSTABLE PACKER MEANS

Robert E. Snyder, Pasadena, and Clyde B. Taylor, Ontario, Calif., assignors, by mesne assignments, to Chiksan Company, Brea, Calif., a corporation of California Application July 5, 1956, Serial No. 595,882

4 Claims. (Cl. 285—39)

This invention relates to swivel couplings for pipes and the like and particularly to a swivel coupling of this character embodying a new and improved adjustable packer.

The packer in swivel pipe couplings is subject to wear and deterioration due to sliding friction between it and the coupling parts and, in many cases, to the extreme temperatures and pressures to which the packer is subjected.

In some instances the packer may become so worn or otherwise deteriorated that fluid leakage at the coupling can be prevented only by repair or complete replacement of the packer. Patent No. 2,451,269, issued October 12, 1948, entitled Flexible Tubing Joint, and assigned to the assignee of the instant application, disclosed a swivel coupling which is so constructed as to greatly facilitate the removal of the packer for such purposes.

In many cases, however, the packer may be only slightly worn so that simple adjustment or tightening thereof would suffice to reestablish the fluid-tight integrity of the coupling. Swivel couplings embodying means for accomplishing such adjustment have, of course, been devised as, for example, the coupling of the above identified patent.

Prior adjustable couplings, however, possess inherent deficiencies such as requiring partial or complete disassembly of the coupling to accomplish tightening of the packer, or delicate adjustment of the packer adjusting means to achieve uniform sealing contact between it and the coupling parts. In those prior couplings of this character wherein access could be had to the adjusting means without disconnection of the coupling parts, the adjusting means were exposed so as to be prone to damage, contamination, and accidental disturbing of a desired adjustment. Also, in many cases, the force exerted by the adjusting means on the packer, to move the latter into more intimate sealing contact with the coupling parts, was transmitted to the rotary bearings of the coupling so that free rotary movement of the coupling parts was substantially impeded and wearing of the bearings was increased.

A broad object of this invention is the provision of a swivel coupling which avoids the above and other deficiencies of existing swivel couplings of the present general type.

A more specific object is the provision of a swivel coupling in which the packer may be adjusted without disassembly of the coupling.

Another object is the provision of a swivel coupling of the class described having an adjustable packer and wherein adjustment of the packing is accomplished in such a manner as to assure uniform sealing pressure of the packer on the coupling parts.

A further object is the provision of a swivel coupling of the class described wherein the packer and adjusting means therefor are totally enclosed so as to be shielded against damage, contamination, and accidental disturbing of a given setting of the adjusting means.

Yet a further object is the provision of a swivel coupling of the class described wherein the axial loading of the coupling rotary bearings is not affected by adjustment of the packer.

Further objects reside in the provision of a swivel coupling of the class described wherein removal of the packer may be accomplished without disassembly of the coupling rotary bearing and in the provision of a novel packer cartridge for use in the present coupling.

The foregoing as well as other objects and advantages of the invention will become readily apparent to those skilled in the art from a reading of the following detailed description in which reference is made to the accompanying drawings wherein:

Figure 1 is a section taken longitudinally through a present illustrative embodiment of the instant swivel pipe coupling;

Figure 2 is a section, on reduced scale, taken along line 2—2 of Figure 1, illustrating the manner of manipulating the adjusting means to tighten the packer; and Figure 3 is a perspective view, on reduced scale, illustrating an adjusting nut and cartridge packer comprising the adjustable packer means of the invention, parts being cut away for the sake of clarity.

The swivel pipe coupling shown in Figure 1 comprises relatively rotatable male and female coupling parts 10 and 12, respectively, of generally tubular form which are internally tapered and threaded at their outer ends for receiving terminally threaded pipe sections 14 and 16. The central passages through the parts 10 and 12 are coaxial with the swivel axis of the coupling so as to provide a flow passage 18 through the coupling which is not restricted by relative swiveling of the parts.

Female part 12 includes an enlarged, internally threaded, cylindrical sleeve section 20 which extends from a circumferential shoulder 22 intermediate the ends of the part 12. A sleeve 24 has an externally reduced, cylindrical extension 26 threaded in the cylindrical section 20, the annular end face 28 of the extension being spaced from shoulder 22, as shown.

Male part 10 of the coupling has its inner end telescopically received in the sleeve 24 and is rotatably connected therewith by a suitable bearing, preferably in the form of a double row of antifriction balls 30 engaged within aligned ball races 32 in the sleeve 24 and in an enlarged, cylindrical intermediate section 34 of the male part. A conventional access opening closed by a closure plug, not shown, will be provided in sleeve 24 to permit insertion of the balls 30 into their respective races. An O-ring grease seal 36 may be provided if desired.

The inner cylindrical ends 38 and 40 of the parts 10 and 12, respectively, are reduced and coaxially aligned, as shown, and have their opposing inner end faces slightly spaced to define an annular interstice 42 between the parts. The external cylindrical surfaces of the ends 38 and 40 are provided with a relatively smooth finish and are radially spaced from the inner walls of cylindrical section 20 and sleeve 24 so as to form an annular space 44 for accommodating an annular packer adjusting nut 46 and form an annular recess 48 for receiving a packer 50.

As shown, the plane of the interstice 42 lies substantially midway between the ends of the packing recess 48 defined by the plane of the extension end face 28 and the annular shoulder 52 at the juncture of the reduced inner end 38 and enlarged intermediate section 34 of the male part 10.

The packer 50 illustrated is of preassembled cartridge construction and comprises, as shown most clearly in Figure 3, a generally cylindrical cartridge case including a cylindrical shell 54 of an external diameter to have a close sliding fit in sleeve 24. One end of the shell 54 is inwardly turned to provide shoulder means in the form of an annular flange 56 while the other end of the shell 54 is outwardly flanged at 58. A flat annular retaining ring 60, welded or otherwise bonded to the outer face of the latter flange 58, has a central opening 62 of a diameter somewhat less than the internal diameter of the shell 54. Slidably received in the shell, and retained therein by the ring 60, is an annular pressure plate 64 which functions as an axially adjustable shoulder means opposed to and axially spaced from the stationary shoulder means 56.

Positioned between flange 56 of the cartridge shell 54 and pressure plate 64 are packer means 66 which may take any of several different forms without departing from the scope and spirit of the invention. The packer means illustrated by way of example comprises a series of resilient chevron packer rings 68 and pressure rings 70 alternated as shown.

The chevron packer rings 68 present outer sealing lips 72 which extend slightly radially outwardly of the pressure rings 70 to engage the inner wall of the cartridge shell 54. The packer rings 68 also present inner sealing lips 74 which extend slightly radially inwardly of the pressure rings as well as the circular edges of the central openings in the cartridge flange 56 and pressure plate 64. In assembled condition of the coupling, the packer cartridge 50 is positioned in the packer recess 48, about the ends 38 and 40 of the coupling parts 10 and 12, as shown in Figure 1, with flange 58 of the cartridge seating on the end face 28 of sleeve 24.

The axial dimension of the cartridge between the inner face of flange 58 and the outer face of flange 56 is slightly less than the axial distance between said sleeve end face 28 and shoulder 52 of the male part 10, when the latter is assembled in the female part 12, so that the cartridge flange 56 will be spaced slightly from said shoulder 52, as may be seen in Figure 1. Also the packer rings 68 are so spaced in the cartridge that their inner sealing lips 74 engage the outer cylindrical surfaces of the ends 38 and 40, at opposite sides of the interstice 42.

The means for adjusting the pressure plate 64 is an adjusting nut 46 which comprises a relatively thick, annular member the outer periphery of which is threaded for engagement with the internal threads on the cylindrical section 20 of the female part. The central opening in the nut has a diameter slightly greater than, and receives therethrough the end 40 of the female part. Projecting from the right-hand face of the nut, as viewed in Figure 1, is an annular lip 76 which is internally relieved, as shown, and has an external diameter somewhat less than the diameter of the central opening in the cartridge retaining ring 60 so as to be accommodated for projection through the latter opening to engage the cartridge pressure plate 64.

From the foregoing description, it will be seen that the packer means 66 in the cartridge 50 may be compressed between the pressure plate 64 and cartridge flange 56, by threading of the adjusting nut 46, to cause radial inward and outward expansion of the sealing lips 72 and 74 into intimate sealing contact with the internal surface of cartridge shell 54 and the external surfaces of ends 38 and 40 of the coupling parts. The compressive force applied to the packer by the adjusting nut will, of course, be the same around the complete 360° of the packer rings so that accurately uniform pressure of the sealing lips 72 and 74 against their respective surfaces will be achieved.

It will also be apparent that due to the engagement of cartridge flange 58 with sleeve end face 28 and the spacing between cartridge flange 56 and shoulder 52 on the male part 10, the entire axial compressive thrust on the packer means 66 will be carried by the female part 12 so as to not increase the axial load on the ball bearings 30 or the resistance to relative swiveling of the coupling parts.

As will be observed from Figure 1, the packer adjusting nut 46, as well as the packer 50, is entirely enclosed within the coupling so as to be completely shielded against contamination, damage, and accidental disturbing of a given setting of the nut. Access to the adjusting nut, to permit rotation thereof when additional compression of the packer means 66 is necessary to prevent leakage through the interstice 42, is had through an opening 78 in the cylindrical section 20. Actual rotation of the nut is accomplished by insertion of a bar 80 through the access opening 78 and engagement of the bar in axial notches or grooves 82 in the periphery of the nut, as shown in Figure 2. Light taps, or an axial force on the bar, with the latter inclined, as shown, will produce the desired rotation of the nut. The wall of the access opening 78 is threaded for receiving a threaded closure plug 84 which serves to completely seal the packer and adjusting nut against contamination and also to lock the nut 46 in a given setting. To this latter end, the closure 84 is preferably of softer material than the nut 46.

If, after several adjustments of the packing 66, removal of the latter for repair or replacement is necessary, the same may be readily accomplished, without disturbing or disassembly of the bearings 30, by unthreading of sleeve 24 from the cylindrical section 20. The sleeve and section may be secured against accidental unthreading by means of a lock plate 86.

It will be apparent from the foregoing description that the swivel coupling herein described and illustrated is fully capable of attaining the objects and advantages preliminarily set forth.

Moreover, while a present, preferred embodiment of the coupling has been disclosed for illustrative purposes, numerous modifications in design and arrangement of parts are possible.

By way of illustration, such changes may reside, for example, in the threaded engagement of the adjusting nut 46 with the reduced cylindrical end 40 of the female part rather than with the cylindrical extension of that part, as described. Also, non-cartridge type packers may be employed in lieu of the packer cartridge shown. In this latter case, of course, suitable shoulder means, carried on the female part, will be provided for supporting the end of the packer remote from the adjusting nut so that the thrust of the latter will not be transmitted to the coupling bearings.

Accordingly, it is intended that the invention be limited only by the spirit and scope of the following claims.

We claim:

1. A swivel coupling of the class described, comprising: a generally tubular female part, a generally tubular male part rotatable within the female part, bearing means connecting said parts for relative rotation and against axial separation, said parts including opposing coaxial inner end portions having opposing inner end faces defining an annular interstice between the parts, at least one of said parts being relieved to form an annular recess about said end portions extending to opposite sides of said interstice, axially spaced shoulder means located in said recess at opposite sides of said interstice, one of said shoulder means being adjustable in its axial position with respect to the other shoulder means, shoulder adjusting means mounted on one of said coupling parts for movement of said shoulder adjusting means toward the other coupling part and engaging said adjustable shoulder means to exert axial thrust thereon, means accessible exteriorly of the coupling for actuating said adjusting means to force said adjustable shoulder means toward the other shoulder means, resilient packer means between said two shoulder means adapted to be deformed radially into sealing engagement with the exterior surfaces of said end portions on opposite sides of said interstice in response to axial compression between said shoulder means to prevent fluid leakage into or from the coupling through the interstice, and thrust absorbing means connecting said other shoulder means to said one coupling part to shield the other coupling part and said bearing means from the thrust transmitted to said other shoulder means by said packer means when the packer means is compressed.

2. The subject matter of claim 1 wherein said adjusting means, said shoulder means, and said packer means are entirely enclosed by the coupling parts, there being an opening in said coupling providing access to said adjusting means for operation of the latter, and removable closure means for closing said opening.

3. The subject matter of claim 1 wherein said spaced shoulder means comprise two annular shoulders encircling said end portions, and said adjusting means comprises an anular nut threaded on said one coupling part for axial adjustment when rotated and engaging said adjustable shoulder means to effect axial movement thereof toward said other shoulder means.

4. The subject matter of claim 1 wherein said shoulder means, said resilient packer means, and said thrust absorbing means are in the form of a pre-assembled packer cartridge removably carried by said one coupling part, said thrust absorbing means comprises a cylindrical shell encircling said end portions and containing said resilient packer means, said shell being inwardly flanged at one end to form said other shoulder means, said shell having a flange engaging said one coupling part for retaining the shell against axial movement relative to said one coupling part, the adjustable shoulder means comprising an annular pressure plate axially movable in said shell and said adjusting means comprising an annular nut threaded on said one coupling part and engaging said pressure plate.

References Cited in the file of this patent

UNITED STATES PATENTS

| | | |
|---|---|---|
| 1,866,160 | Griswold | July 5, 1932 |
| 2,293,479 | Thorndike | Aug. 18, 1942 |
| 2,295,490 | Sandherr | Sept. 8, 1942 |
| 2,396,123 | Phillips | Mar. 5, 1946 |
| 2,448,888 | Hynes | Sept. 7, 1948 |
| 2,451,269 | Allen et al. | Oct. 12, 1948 |
| 2,511,109 | Haskell | June 13, 1950 |
| 2,704,676 | Harding | Mar. 22, 1955 |
| 2,717,166 | Hedden | Sept. 6, 1955 |

FOREIGN PATENTS

| | | |
|---|---|---|
| 42,737 | France | June 26, 1933 |
| 87,657 | Switzerland | Dec. 16, 1940 |
| 872,903 | Germany | Apr. 9, 1953 |